US006975671B2

(12) United States Patent
Sindhushayana et al.

(10) Patent No.: US 6,975,671 B2
(45) **Date of Patent: *Dec. 13, 2005**

(54) SYSTEM AND METHOD FOR PROVIDING AN ACCURATE ESTIMATION OF RECEIVED SIGNAL INTERFERENCE FOR USE IN WIRELESS COMMUNICATIONS SYSTEMS

(75) Inventors: Nagabhushana T. Sindhushayana, San Diego, CA (US); Eduardo A. S. Esteves, Del Mar, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/682,047

(22) Filed: Oct. 8, 2003

(65) Prior Publication Data

US 2004/0091025 A1 May 13, 2004

Related U.S. Application Data

(63) Continuation of application No. 09/310,053, filed on May 11, 1999, now Pat. No. 6,661,832.

(51) Int. Cl.[7] ................................................ H04B 1/707

(52) U.S. Cl. ....................... 375/144; 375/148; 375/227; 370/342

(58) Field of Search ................................ 375/144, 147, 375/148, 224, 227, 346, 347; 370/320, 335, 342, 441; 455/63, 65, 67.1, 67.3, 135, 137, 226.1, 226.2, 226.3, 296

(56) References Cited

U.S. PATENT DOCUMENTS

| | | | | |
|---|---|---|---|---|
| 4,901,307 | A | 2/1990 | Gilhousen et al. | 370/320 |
| 5,056,109 | A | 10/1991 | Gilhousen et al. | 370/342 |
| 5,103,459 | A | 4/1992 | Gilhousen et al. | 370/206 |
| 5,109,390 | A | 4/1992 | Gilhousen et al. | 370/335 |
| 5,245,629 | A | 9/1993 | Hall | 375/130 |
| 5,396,516 | A | 3/1995 | Padovani et al. | 375/225 |
| 5,414,796 | A | 5/1995 | Jacobs et al. | 704/221 |
| 5,416,797 | A | 5/1995 | Gilhousen et al. | 370/335 |
| 5,440,582 | A | 8/1995 | Birchler et al. | 375/227 |
| 5,548,808 | A | 8/1996 | Bruckert et al. | 455/33.2 |
| 5,559,790 | A | 9/1996 | Yano et al. | 370/18 |
| 5,566,165 | A | 10/1996 | Sawahashi et al. | 370/342 |
| 5,566,206 | A | 10/1996 | Butler et al. | 375/225 |
| 5,568,483 | A | 10/1996 | Padovani et al. | 370/84 |
| 5,577,025 | A | 11/1996 | Skinner et al. | 370/22 |
| 5,603,096 | A | 2/1997 | Gilhousen et al. | 455/69 |

(Continued)

FOREIGN PATENT DOCUMENTS

| | | |
|---|---|---|
| EP | 0776105 | 5/1997 |
| WO | 9604718 | 2/1996 |
| WO | 9820617 | 5/1998 |

*Primary Examiner*—Betsy L. Deppe
(74) *Attorney, Agent, or Firm*—Phil R. Wadsworth; Sandra L. Godsey

(57) ABSTRACT

A system for providing an accurate interference value signal received over a channel and transmitted by an external transceiver. The system includes a first receiver section for receiving the signal, which has a desired signal component and an interference component. A signal extracting circuit extracts an estimate of the desired signal component from the received signal. A noise estimation circuit provides the accurate interference value based on the estimate of the desired signal component and the received signal. A look-up table transforms the accurate noise and/or interference value to a normalization factor. A carrier signal-to interference ratio circuit employs the normalization factor and the received signal to compute an accurate carrier signal-to-interference ratio estimate. Path-combining circuitry generates optimal path-combining weights based on the received signal and the normalization factor.

16 Claims, 6 Drawing Sheets

U.S. PATENT DOCUMENTS

| | | | | |
|---|---|---|---|---|
| 5,721,754 A | | 2/1998 | Chen | 375/227 |
| 5,754,533 A | | 5/1998 | Bender et al. | 370/252 |
| 5,774,496 A | | 6/1998 | Butler et al. | 375/225 |
| 5,881,057 A | | 3/1999 | Komatsu | 370/335 |
| 5,903,554 A | | 5/1999 | Saints | 370/342 |
| 6,032,026 A | | 2/2000 | Seki et al. | 455/63.1 |
| 6,141,334 A | | 10/2000 | Flanagan et al. | 370/342 |
| 6,661,832 B1 | * | 12/2003 | Sindhushayana et al. | 375/148 |

* cited by examiner

SYSTEM AND METHOD FOR PROVIDING AN ACCURATE ESTIMATION OF RECEIVED SIGNAL INTERFERENCE FOR USE IN WIRELESS COMMUNICATIONS SYSTEMS

CLAIM OF PRIORITY UNDER 35 U.S.C. §120

The present Application for Patent is a Continuation and claims priority to patent application Ser. No. 09/310,053 entitled "SYSTEM AND METHOD FOR PROVIDING AN ACCURATE ESTIMATION OF RECEIVED SIGNAL INTERFERENCE FOR USE IN WIRELESS COMMUNICATIONS SYSTEMS," filed May 11, 1999, now U.S. Pat. No. 6,661,832, issued on Dec. 9, 2003 to Sindhushayana et al., and assigned to the assignee hereof and hereby expressly incorporated by reference herein.

BACKGROUND

1. Field

This invention relates to communications systems. Specifically, the present invention relates to systems for estimating the interference spectral density of a received signal in wireless code division multiple access (CDMA) communications systems for aiding in rate and power control and signal decoding.

2. Background

Wireless communications systems are used in a variety of demanding applications including search and rescue and business applications. Such applications require efficient and reliable communications that can effectively operate in noisy environments.

Wireless communications systems are characterized by a plurality of mobile stations in communication with one or more base stations. Signals are transmitted between a base station and one or more mobile stations over a channel. Receivers in the mobile stations and base stations must estimate noise introduced to the transmitted signal by the channel to effectively decode the transmitted signal.

In a code division multiple access (CDMA) communications system, signals are spread over a wide bandwidth via the use of a pseudo noise (PN) spreading sequence. When the spread signals are transmitted over a channel, the signals take multiple paths from the base station to the mobile station. The signals are received from the various paths at the mobile station, decoded, and constructively recombined via path-combining circuitry such as a Rake receiver. The path-combining circuitry applies gain factors, called weights, to each decoded path to maximize throughput and compensate for path delays and fading.

Often, a communications system transmission includes a pilot interval, a power control interval, and a data interval. During the pilot interval, the base station transmits a pre-established reference signal to the mobile station. The mobile station combines information from the received reference signal, i.e., the pilot signal, and the transmitted pilot signal to extract information about the channel, such as channel interference and signal-to-noise (SNR) ratio. The mobile station analyzes the characteristics of the channel and subsequently transmits a power control signal to the base station in response thereto during a subsequent power control interval. For example, if the base station is currently transmitting with excess power, given the current channel characteristics, the mobile station sends a control signal to the base station requesting that transmitted power level be reduced.

Digital communications systems often require accurate log-likelihood ratios (LLRs) to accurately decode a received signal. An accurate signal-to-noise ratio (SNR) measurement or estimate is typically required to accurately calculate the LLR for a received signal. Accurate SNR estimates require precise knowledge of the noise characteristics of the channel, which may be estimated via the use of a pilot signal.

The rate or power at which a base station or mobile station broadcasts a signal is dependant on the noise characteristics of the channel. For maximum capacity, transceivers in the base stations and mobile stations control the power of transmitted signals in accordance with an estimate of the noise introduced by the channel. If the estimate of the noise, i.e., the interference spectral density of different multipath components of the transmitted signal is inaccurate, the transceivers may broadcast with too much or too little power. Broadcasting with too much power may result in inefficient use of network resources, resulting in a reduction of network capacity and a possible reduction in mobile station battery life. Broadcasting with too little power may result in reduced throughput, dropped calls, reduced service quality, and disgruntled customers.

Accurate estimates of the noise introduced by the channel are also required to determine optimal path-combining weights. Currently, many CDMA telecommunications systems calculate SNR ratios as a function of the carrier signal energy to the total spectral density of the received signal. This calculation is suitable at small SNRs, but becomes inaccurate at larger SNRs, resulting in degraded communications system performance.

In addition, many wireless CDMA communications systems fail to accurately account for the fact that some base stations that broadcast during the pilot interval do not broadcast during the data interval. As a result, noise measurements based on the pilot signal may become inaccurate during the data interval, thereby reducing system performance.

Hence, a need exists in the art for a system and method for accurately determining the interference spectral density of a received signal, calculating an accurate SNR or carrier signal-to-interference ratio, and determining optimal path-combining weights. There is a further need for a system that accounts for base stations that broadcast pilot signals during the pilot interval, but that do not broadcast during the data interval.

SUMMARY

The need in the art for the system for providing an accurate interference value for a signal received over a channel and transmitted by an external transceiver of the present invention is now addressed. In the illustrative embodiment, the inventive system is adapted for use with a wireless code division multiple access (CDMA) communications system and includes a first receiver section for receiving the signal, which has a desired signal component and an interference and/or noise component. A signal-extracting circuit extracts an estimate of the desired signal component from the received signal. A noise estimation circuit provides the accurate interference value based on the estimate of the desired signal component and the received signal. A look-up table transforms the accurate noise and/or interference value to a normalization factor. A carrier signal-to-interference ratio circuit employs the normalization factor and the received signal to compute an accurate carrier signal-to-interference ratio estimate. Path-combining circuitry generates optimal path-combining weights based on the received signal and the normalization factor.

In the illustrative embodiment, the system further includes a circuit for employing the accurate interference value to compute a carrier signal-to-interference ratio (C/I). The system further includes a circuit for computing optimal path-combining weights for multiple signal paths comprising the signal using the accurate interference value and providing optimally combined signal paths in response thereto. The system also includes a circuit for computing a log-likelihood value based on the carrier signal-to-interference ratio and the optimally combined signal paths. The system also includes a circuit for decoding the received signal using the log-likelihood value. An additional circuit generates a rate and/or power control message and transmits the rate and/or power control message to the external transceiver.

In a specific embodiment, the first receiver section includes downconversion and mixing circuitry for providing in-phase and quadrature signal samples from the received signal. The signal extracting circuit includes a pseudo noise despreader that provides despread in-phase and quadrature signal samples from the in-phase and quadrature signal samples. The signal extracting circuit further includes a decovering circuit that separates data signals and a pilot signal from the despread in-phase and quadrature signal samples and provides a data channel output and a pilot channel output in response thereto. The signal extracting circuit further includes an averaging circuit for reducing noise in the pilot channel output and providing the estimate of the desired signal component as output in response thereto. The noise estimation circuit includes a circuit for computing a desired signal energy value associated with the estimate, multiplying the desired signal energy value by a predetermined constant to yield a scaled desired signal energy value, and subtracting the scaled desired signal energy value from an estimate of the total energy associated with the received signal to yield the accurate interference value.

An alternative implementation of the noise estimation circuit includes a subtractor that subtracts the desired signal component from the pilot channel output and provides an interference signal in response thereto. The noise estimation circuit includes an energy computation circuit for providing the accurate interference value from the interference signal.

The accurate interference value is applied to a look-up table (LUT), which computes the reciprocal of the interference power spectral density, which corresponds to the accurate interference value. The reciprocal is then multiplied by the scaled desired signal energy value to yield a carrier signal-to-interference ratio (C/I) estimate that is subsequently averaged by an averaging circuit and input to a log likelihood ratio (LLR) circuit. The reciprocal is also multiplied by path-combining weights derived from the pilot channel output to yield normalized optimal path-combining weight estimates, which are subsequently scaled by a constant factor, averaged, and input to the LLR circuit, which computes the LLR of the received signal.

The circuit for computing optimal path-combining weights for each multiple signal path comprising the received signal includes a circuit for providing a scaled estimate of the complex amplitude of the desired signal component from an output of a pilot filter and a constant providing circuit. The scaled estimate is normalized by the accurate interference value. A conjugation circuit provides a conjugate of the scaled estimate, which is representative of the optimal path-combining weights.

The novel design of the present invention is facilitated by the noise estimation circuit that provides an accurate estimate of an interference component of the received signal. The accurate estimate of the interference component results in a precise estimate of carrier signal-to-interference ratio, which facilitates optimal decoding of the received signal.

DETAILED DESCRIPTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
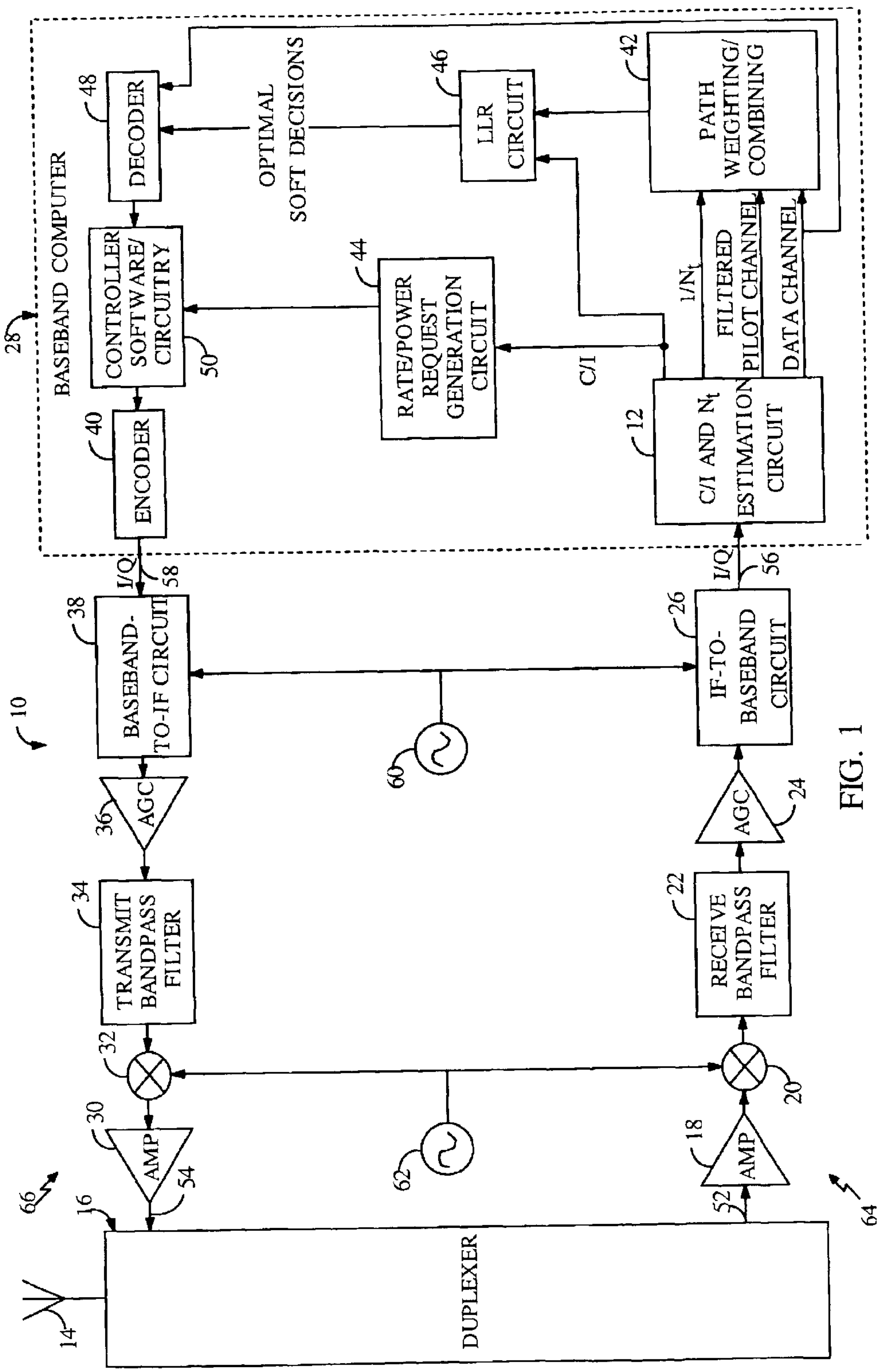
FIG. 1 is a diagram of a telecommunications system of the present invention having an accurate interference energy computation circuit.

FIG. 1 is a diagram of a telecommunications transceiver system 10, hereinafter referred to as transceiver system 10, of the present invention having an accurate carrier signal-to-interference (C/I) and interference energy (Nt) estimation circuit 12. The transceiver system 10 is adapted for use with a CDMA mobile station. In the present specific embodiment, signals received by the transceiver system 10 are received over a forward communications link between a base station (not shown) and the transceiver system 10. Signals transmitted by the transceiver system 10 are transmitted over a reverse communications link from the transceiver system 10 to the associated base station.

For clarity, many details of the transceiver system 10 have been omitted, such as clocking circuitry, microphones, speakers, and so on. Those skilled in the art can easily implement the additional circuitry without undue experimentation.

The transceiver system 10 is a dual conversion telecommunications transceiver and includes an antenna 14 connected to a duplexer 16. The duplexer 16 is connected to a receive path that includes, from left to right, a receive amplifier 18, a radio frequency (RF) to intermediate frequency (IF) mixer 20, a receive bandpass filter 22, a receive automatic gain control circuit (AGC) 24, and an IF-to-baseband circuit 26. The IF-to-baseband circuit 26 is connected to a baseband computer 28 at the C/I and Nt estimation circuit 12.

The duplexer 16 is also connected to a transmit path 66 that includes a transmit amplifier 30, an IF-to-RF mixer 32, a transmit bandpass filter 34, a transmit AGC 36, and a baseband-to-IF circuit 38. The transmit baseband-to-1F circuit 38 is connected to the baseband computer 28 at an encoder 40.

The C/I and Nt estimation circuit 12 in the baseband computer 28 is connected to a path-weighting and combining circuit 42, a rate/power request generation circuit 44, and a log-likelihood ratio (LLR) circuit 46. The LLR circuit 46 is also connected to the path-weighting and combining circuit 42 and a decoder 48. The decoder 48 is connected to a software/circuitry controller 50, hereinafter referred to as the controller 50 that is also connected to the rate/power request generation circuit 44 and the encoder 40.

The antenna 14 receives and transmits RF signals. A duplexer 16, connected to the antenna 14, facilitates the separation of receive RF signals 52 from transmit RF signals 54.

RF signals 52 received by the antenna 14 are directed to the receive path 64 where they are amplified by the receive amplifier 18, mixed to intermediate frequencies via the RF-to-IF mixer 20, filtered by the receive bandpass filter 22, gain-adjusted by the receive AGC 24, and then converted to digital baseband signals 56 via the IF-to-baseband circuit 26. The digital baseband signals 56 are then input to a digital baseband computer 28.

In the present embodiment, the transceiver system 10 is adapted for use with quadrature phase shift-keying (QPSK) modulation and demodulation techniques, and the digital baseband signals 56 are quadrature amplitude modulation (QAM) signals that include both in-phase (I) and quadrature (Q) signal components. The I and Q baseband signals 56 represent both pilot signals and data signals transmitted from a CDMA telecommunications transceiver such as a transceiver employed in a base station.

In the transmit path 66, digital baseband computer output signals 58 are converted to analog signals via the baseband-to-IF circuit 38, mixed to 1F signals, filtered by the transmit bandpass filter 34, mixed up to RF by the IF-to-RF mixer 32, amplified by the transmit amplifier 30 and then transmitted via the duplexer 16 and the antenna 14.

Both the receive and transmit paths 64 and 66, respectively, are connected to the digital baseband computer 28. The digital baseband computer 28 processes the received baseband digital signals 56 and outputs the digital baseband computer output signals 58. The baseband computer 28 may include such functions as signal-to-voice conversions and/or vise versa.

The baseband-to-IF circuit 38 includes various components (not shown) such as digital-to-analog converters (DACs), mixers, adders, filters, shifters, and local oscillators. The baseband computer output signals 58 include both in-phase (I) and quadrature (Q) signal components that are 90° out of phase. The output signals 58 are input to digital-to-analog converters (DACs) in the analog baseband-to-IF circuit 38, where they are converted to analog signals that are then filtered by lowpass filters in preparation for mixing. The phases of the output signals 58 are adjusted, mixed, and summed via a 90° shifter (not shown), baseband-to-IF mixers (not shown), and an adder (not shown), respectively, included in the baseband-to-IF circuit 38.

The adder outputs IF signals to the transmit AGC circuit 36 where the gain of the mixed IF signals is adjusted in preparation for filtering via the transmit bandpass filter 34, mixing up to RF via the IF-to-transmit mixer 32, amplifying via the transmit amplifier 30, and eventually, the radio transmission via the duplexer 16 and the antenna 14.

Similarly, the IF-to-baseband circuit 26 in the receive path 64 includes circuitry (not shown) such as analog-to-digital (ADC) converters, oscillators, and mixers. A received gain-adjusted signals output from the receive AGC circuit 24 is transferred to the IF-to-baseband circuit 26 where it is mixed to baseband via mixing circuitry and then converted to digital signals via analog-to-digital converters (ADCs).

Both the baseband-to-IF circuit 38 and the IF-to-baseband circuit 26 employ an oscillator signal provided via a first oscillator 60 to facilitate mixing functions. The receive RF-to-IF mixer 20 and the transmit IF-to-RF mixer 32 employ an oscillator signal input from a second oscillator 62. The first and second oscillators 60 and 62, respectively, may be implemented as phase-locked loops that derive output signals from a master reference oscillator signal.

Those skilled in the art will appreciate that other types of receive and transmit paths 64 and 66 may be employed instead without departing from the scope of the present invention. The various components such as amplifiers 18 and 30, mixers 20 and 32, filters 22 and 34, AGC circuits 24 and 36, and frequency conversion circuits 26 and 38 are standard components and may easily be constructed by those having ordinary skill in the art and access to the present teachings.

In the baseband computer 28, the received I and Q signals 56 are input to the C/I and Nt estimation circuit 12. The C/I and Nt estimation circuit 12 accurately determines the interference energy of the I and Q signals 56 based on the pilot signal and determines a carrier signal-to-interference ratio in response thereto. The carrier signal-to-interference ratio (C/I) is similar to the signal-to-noise ratio (SNR) and is the ratio of the energy of the received I and Q signals 56 less interference and noise components to the interference energy of the received I and Q signals 56. Conventional C/I estimation circuits often fail to accurately estimate the multipath interference energy.

The C/I and Nt estimation circuit 12 outputs a C/I signal to the rate/power request generation circuit 44 and the LLR circuit 46. The C/I and Nt estimation circuit 12 also outputs the reciprocal of the interference energy (1/Nt), a despread and decovered data channel signal, and a despread and decovered pilot channel signal to the path-weighting and combining circuit 42. The despread and decovered data channel signal is also provided to the decoder 48 where it is decoded and forwarded to the controller 50. At the controller 50, the decoded signal is processed to output voice or data, or to generate a reverse link signal for transfer to the associated base station (not shown).

The path-weighting and combining circuit 42 computes optimal ratio path-combining weights for multipath components of the received data signal corresponding to the data channel signal, weights the appropriate paths, combines the multiple paths, and provides the summed and weighted paths as a metric to the LLR circuit 46.

The LLR circuit 46 employs metrics from the path-weighting and combining circuit 42 with the C/I estimation provided by the C/I and Nt estimation circuit 12 to generate an optimal LLR and soft decoder decision values. The optimal LLR and soft decoder decision values are provided to the decoder 48 to facilitate decoding of the received data channel signals. The controller 50 then processes the decoded data channel signals to output voice or data via a speaker or other device (not shown). The controller 50 also controls the sending of speech signals and data signals from an input device (not shown) to the encoder 40 in preparation for transmission.

The rate/power request generation circuit 44 generates a rate control or power fraction request message based on the C/I signal input from the C/I and Nt estimation circuit 12. The rate/power request generation circuit 44 compares the C/I with a set of predetermined thresholds. The rate/power request generation circuit 44 generates a rate request or power control message based on the relative magnitude of the C/I signal with respect to the various thresholds. The exact details of the rate/power request generation circuit 44 are application-specific and easily determined and implemented by those ordinarily skilled in the art to suit the needs of a given application.

The resulting rate control or power fraction request message is then transferred to the controller 50. The controller 50 prepares the power fraction request message for encoding via the encoder 40 and eventual transmission to the associated base station (not shown) over a data rate request channel (DRC) via the transmit path 66, duplexer 16 and antenna 14. When the base station receives the rate control or power fraction request message, the base station adjusts the rate and/or power of the transmitted signals accordingly.

The accurate C/I and Nt estimates from the C/I and Nt estimation circuit 12 improve the performance of the rate/power request generation circuit 44 and improve the performance of the decoder 48, thereby improving the throughput and efficiency of the transceiver system 10 and associated telecommunications system.

Figure 2:
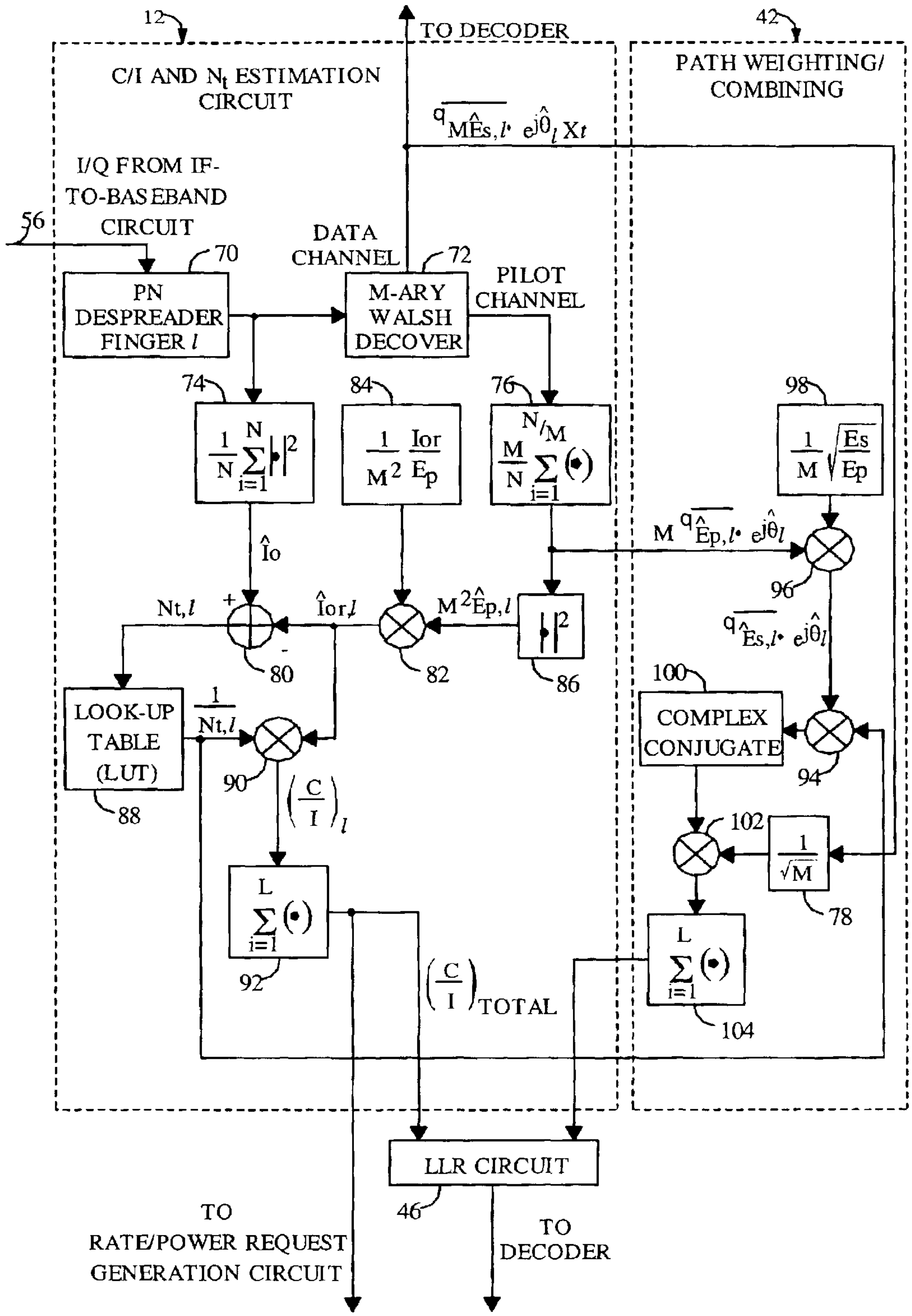
FIG. 2 is a more detailed diagram of the accurate interference energy computation circuit, log-likelihood ratio (LLR) circuit, and the path-combining circuit of FIG. 1 adapted for use with forward link transmissions.

FIG. 2 is a more detailed diagram of the accurate C/I and Nt estimation circuit 12, LLR circuit 46, and path-weighting and combining circuit 42 of FIG. 1 adapted for use with forward link transmissions.

The C/I and Nt estimation circuit 12 includes, from left to right and top to bottom, a pseudo noise (PN) despreader 70, an M-ary Walsh decover circuit 72, a total received signal energy (Io) computation circuit 74, a first constant circuit 84, a pilot filter 76, a subtractor 80, a first multiplier 82, a pilot energy calculation circuit 86, a look-up table (LUT) 88, a second multiplier 90, and a C/I accumulation circuit 92. In the C/I and Nt estimation circuit 12, the pseudo noise (PN) despreader 70 receives the I and Q signals 56 from the IF-to-baseband circuit 26 of FIG. 1. The PN despreader 70 provides input, in parallel, to the M-ary Walsh decover circuit 72 and the Io computation circuit 74. The M-ary Walsh decover circuit 72 provides input to the pilot filter 76 and to a constant divider circuit 78 in the path-weighting and combining circuit 42.

The output of the energy computation circuit 74 is connected to a positive terminal of the subtractor circuit 80. A negative terminal of the subtractor circuit 80 is connected to an output terminal of a first multiplier 82. A first input of the first multiplier 82 is connected to an output of the first constant circuit 84. A second input of the first multiplier 82 is connected to an output of the pilot energy calculation circuit 86. The pilot filter 76 provides input to the pilot energy calculation circuit 86.

An output of the subtractor 80 is connected to the look-up table (LUT) 88. An output of the LUT 88 is connected, in parallel, to a first input of the second multiplier 90 and a first input of a third multiplier 94 in the path-weighting and combining circuit 42. A second input of the second multiplier 90 is connected to the output of the first multiplier 82. An output of the second multiplier 90 is connected to the C/I accumulator circuit 92, the output of which provides input to the LLR circuit 46.

The path-weighting and combining circuit 42 includes a second constant generation circuit 98, a fourth multiplier 96, the third multiplier 94, the constant divider circuit 78, a complex conjugate circuit 100, a fifth multiplier 102, and a path accumulator circuit 104. In the path-weighting and combining circuit 42, a first terminal of the fourth multiplier 96 is connected to the output of the pilot filter 76, which is also connected to an input of the pilot energy calculation circuit 86 in the C/I and Nt estimation circuit 12. A second terminal of the fourth multiplier 96 is connected to the second constant generation circuit 98. An output of the fourth multiplier 96 is connected to a second input of the third multiplier 94. The output of the third multiplier 94 provides input to the complex conjugate circuit 100. The output of the complex conjugate circuit 100 is connected to a first input of the fifth multiplier 102. An output of the constant divider circuit 78 is connected to a second input of the fifth multiplier 102. An output of the fifth multiplier 102 is connected to an input of the path accumulator circuit 104. The output of the path accumulator circuit 104 is connected to a second input of the LLR circuit 46. The output of the LLR circuit is connected to an input of a decoder (see 48 of FIG. 1).

In operation, the PN despreader 70 receives the I and Q signals and despreads L fingers, i.e., paths (l). The PN despreader 70 despreads the I and Q signals using an inverse of the pseudo noise sequence used to spread the I and Q signals before transmission over the channel. The construction and operation of the PN despreader 70 is also well known in the art.

Despread signals are output from the PN despreader 70 and input to the M-ary Walsh decover 72 and the Io computation circuit 74. The Io computation circuit 74 computes the total received energy (Io) per chip, which includes both a desired signal component and an interference and noise component. The Io computation circuit provides an estimate ($\hat{I}_o$) of Io in accordance with the following equation:

$$\hat{I}_o = \frac{1}{N}\sum_{i=1}^{N} |\bullet|^2, \qquad [1]$$

where N is the number of chips per pilot burst and is 64 in the present specific embodiment and • represents the received despread signal output from the PN despreader 70.

Those skilled in the art will appreciate that the $I_o$ may be computed before despreading by the PN despreader 70 without departing from the scope of the present invention. For example, the $I_o$ computation circuit 74 may receive direct input from the I and Q signals 56 instead of input provided by the PN despreader 70, in which case an equivalent estimate of $I_o$ will be provided at the output of the $I_o$ computation circuit 74.

The M-ary Walsh decover circuit 72 decovers orthogonal data signals, called data channels, and pilot signals, called the pilot channel, in accordance with methods known in the art. In the present specific embodiment, the orthogonal data signals correspond to one data channel(s) that is represented by the following equation:

$$s=\sqrt{M\hat{E}_{s,l}}\,e^{j\hat{\theta}_l}x_t, \qquad [2]$$

where M is the number of chips per Walsh symbol, $\hat{E}_{s,l}$ is the modulation symbol energy of the $l^{th}$ multipath component, $\hat{\theta}_l$ is the phase of the data channel s, and $X_t$ is the information-bearing component of the data channel s. The decovered data channel represented by equation (2) is provided to the decoder (see 48 of FIG. 1) and to the constant divider circuit 78 of the path-weighting and combining circuit 42.

While the present invention is adapted for use with signals comprising various Walsh codes, the present invention is easily adaptable for use with other types of codes by those ordinarily skilled in the art.

The pilot channel is input to the pilot filter 76. The pilot filter 76 is an averaging filter that acts as a lowpass filter, which removes higher frequency noise and interference components from the pilot channel. The output of the pilot filter 76 (p) is represented by the following equation:

$$p=M\sqrt{\hat{E}_{p,l}}e^{j\theta_l}, \tag{3}$$

where M is the number of chips per Walsh symbol, $\hat{E}_{p,l}$ is the pilot chip energy of the $l^{th}$ multipath component, and $\theta_l$ is the phase of the filtered pilot channel p.

An estimate of the energy of the filtered pilot channel p is computed via the pilot energy calculation circuit 86, which is a square of the complex amplitude of the filtered pilot channel p represented by equation (3). The square of the complex amplitude of the filtered pilot channel p is multiplied by a predetermined scale factor c represented by the following equation:

$$c=\frac{1}{M^2}\frac{I_{or}}{E_p}, \tag{4}$$

where $l_{or}$ is the received energy of the desired signal, i.e., is equivalent to $I_o$ less noise and interference components. $E_p$ is the pilot chip energy. The scale factor c is a known forward link constant in many wireless communications systems.

The scale factor c is multiplied by the energy of the filtered pilot signal p via the first multiplier 82 to yield an accurate estimate $\hat{I}_{or,l}$ of the energy of the received desired signal (Io less noise and interference components) associated with the th multipath component of the received signals 56.

The accurate estimate $\hat{I}_{or,l}$ is subtracted from the estimate of $I_o$ via the subtractor 80 to yield an accurate measurement of the interference energy ($N_{t,l}$) associated with the $l^{th}$ multipath component. $N_{t,l}$ is then provided to the LUT 88, which outputs the reciprocal of $N_{t,l}$ to the third multiplier 94 in the path-weighting and combining circuit 42 and to the first input of the second multiplier 90. The second input of the second multiplier 90 is connected to the output of the first multiplier 82, which provides $\hat{I}_{or,l}$ at the second input terminal of the second multiplier 90. The second multiplier 90 outputs an accurate estimate of the carrier signal-to-interference ratio $(C/I)_l$ associated with the $l^{th}$ multipath component in accordance with the following equation:

$$\left(\frac{C}{I}\right)_l=\frac{\hat{I}_{or,l}}{N_{t,l}}. \tag{5}$$

The accurate C/I value is then accumulated over L paths in the received signal via the C/I accumulator circuit 92. The accumulated C/I values are then provided to the LLR circuit 46 and to the rate/power request generation circuit (see 44 of FIG. 1).

In the path-weighting and combining circuit 42, the fourth multiplier 96 multiplies the filtered pilot signal p by a constant k provided by the second constant generation circuit 98. The constant k is computed in accordance with the following equation:

$$k=\frac{1}{M}\sqrt{\frac{E_s}{E_p}}, \tag{6}$$

where $E_s$ is the modulation symbol energy, $E_p$ is the pilot symbol energy, and M is the number of Walsh symbols per chip as mentioned above. The ratio of $E_s$ to $E_p$ is often a known constant for both reverse link and forward link transmissions.

The output of the fourth multiplier 96 provides an estimate of the channel coefficient ($\hat{\alpha}$) described by the following equation:

$$\hat{\alpha}\sqrt{\hat{E}_{s,l}}\cdot e^{j\hat{\theta}_l}, \tag{7}$$

where $\hat{E}_{s,l}$ is an estimate of the modulation symbol energy of the $l^{th}$ multipath component, $\hat{\theta}_l$ is an estimate of the phase of the pilot signal. The channel $\hat{\alpha}$ is a scaled estimate of the complex amplitude of the output of the pilot filter 76.

The channel estimate is then multiplied by the reciprocal of the interference energy Nt,l associated with the 1 th multipath component by the third multiplier 94. The interference energy Nt,l includes both interference and noise components. The complex conjugate circuit 100 then computes the conjugate of the output of the third multiplier 94, which represents maximal ratio path-combining weights. The maximal ratio path-combining weights are then multiplied by the corresponding data symbol output from the divider circuit 78 via the fifth multiplier 102. The data symbol (d) is represented by the following equation:

$$d=\sqrt{\hat{E}_{s,l}}\cdot e^{j\hat{\theta}_l}X_t, \tag{8}$$

where the variables are as given for equations (2) and (7).

The output of the fifth multiplier 102 represents optimally weighted data signals that are then accumulated over the L paths that comprise the signals via the path combiner circuit 104. The resulting optimally combined data signals are provided to the LLR circuit 46, which facilitates the calculation of optimal soft decoder inputs to the decoder (see 48 of FIG. 1).

Those skilled in the art will appreciate that the constants c and k provided by the first constant generation circuit 84 and the second constant generation circuit 98, respectively, may be constants or variables other than those represented by equations (3) and (6) without departing from the scope of the present invention.

Figure 3:
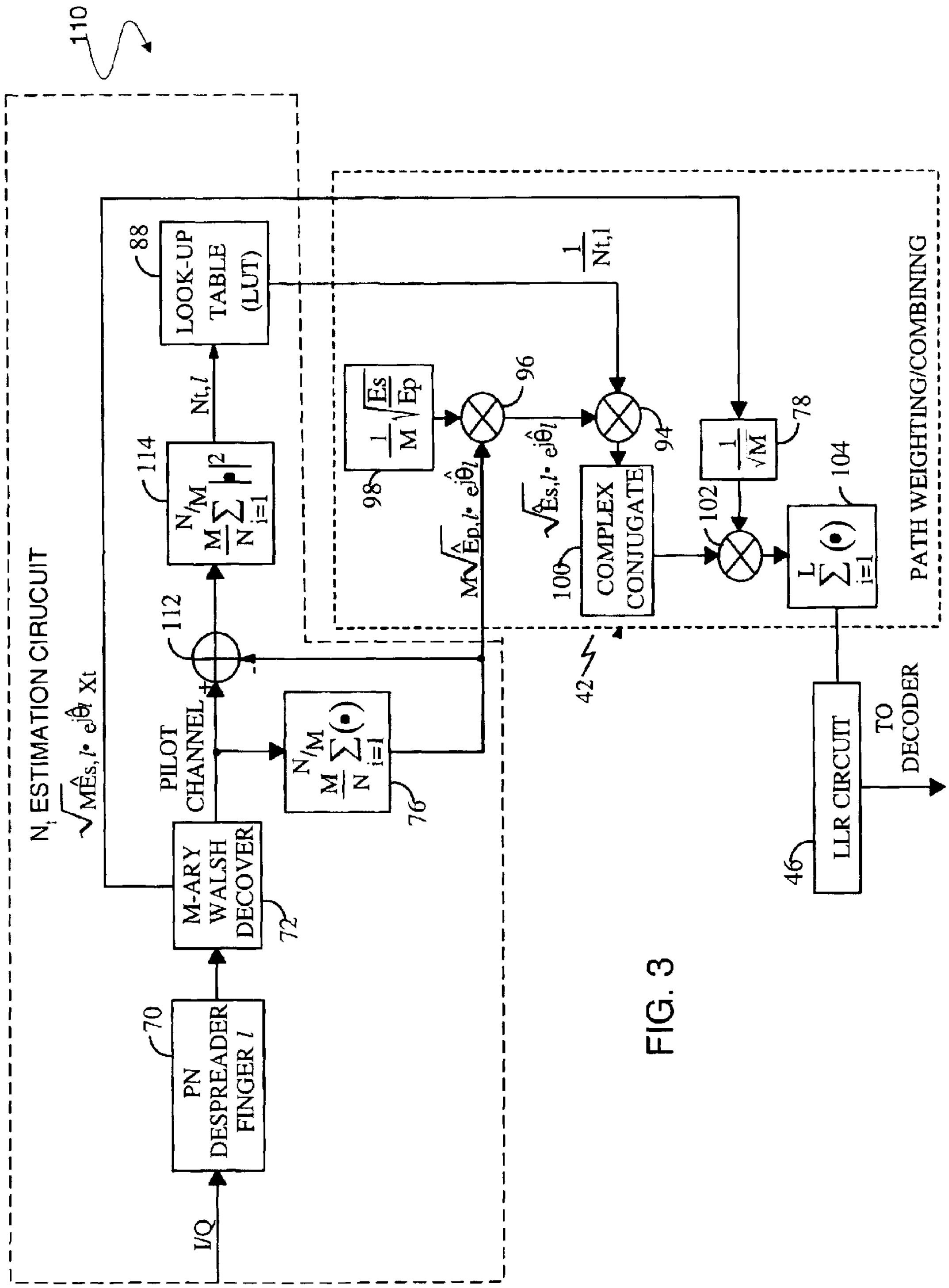
FIG. 3 is a diagram of an accurate interference energy computation circuit optimized for reverse link transmission and including the path-weighting and combining circuit and the LLR circuit of FIG. 2.

FIG. 3 is a diagram of an accurate interference energy computation circuit 110 optimized for reverse link transmission and including the path-weighting and combining circuit 42 and the LLR circuit 46 of FIG. 2.

The operation of the interference energy computation circuit 110 is similar to the operation of the C/I and Nt estimation circuit 12 of FIG. 2 with the exception of the calculation of Nt. The interference energy computation circuit 110 includes the PN despreader 70, the M-ary Walsh decover circuit 72, and the pilot filter 76. The M-ary Walsh decover circuit 72 decovers, i.e., extracts the pilot channel and the data channel from the despread I and Q signal samples output from the PN despreader 70.

In the interference energy computation circuit 110, the pilot channel is provided to a positive input of a pilot subtractor circuit 112 and to the pilot filter 76. The pilot filter 76 suppresses noise and interference components in the pilot channel and provides a filtered pilot signal to a negative input of the pilot subtraction circuit 112. The pilot subtractor circuit 112 subtracts the pilot channel from the filtered pilot channel and outputs a signal representative of the interference and noise per symbol introduced by the channel between the transmitting base station (not shown) and the transceiver system (see 10 of FIG. 1) in which the interference energy computation circuit 110 is employed. The energy (Nt,l) of the interference and noise signal for each symbol is computed via an interference energy computation circuit 114 in accordance with the following equation:

$$N_{t,l} = \frac{M}{N}\sum_{i=1}^{N/M} |\bullet|^2, \qquad [9]$$

where M is the number of chips per Walsh symbol, N is the number of chips (64 chips) in the pilot burst, and • is the output of the pilot subtractor circuit 112.

The interference energy computation circuit 110 is employed when the constant value c provided by the first constant generation circuit 84 of FIG. 2 is not known. This is the case with many reverse link applications.

Figure 4:
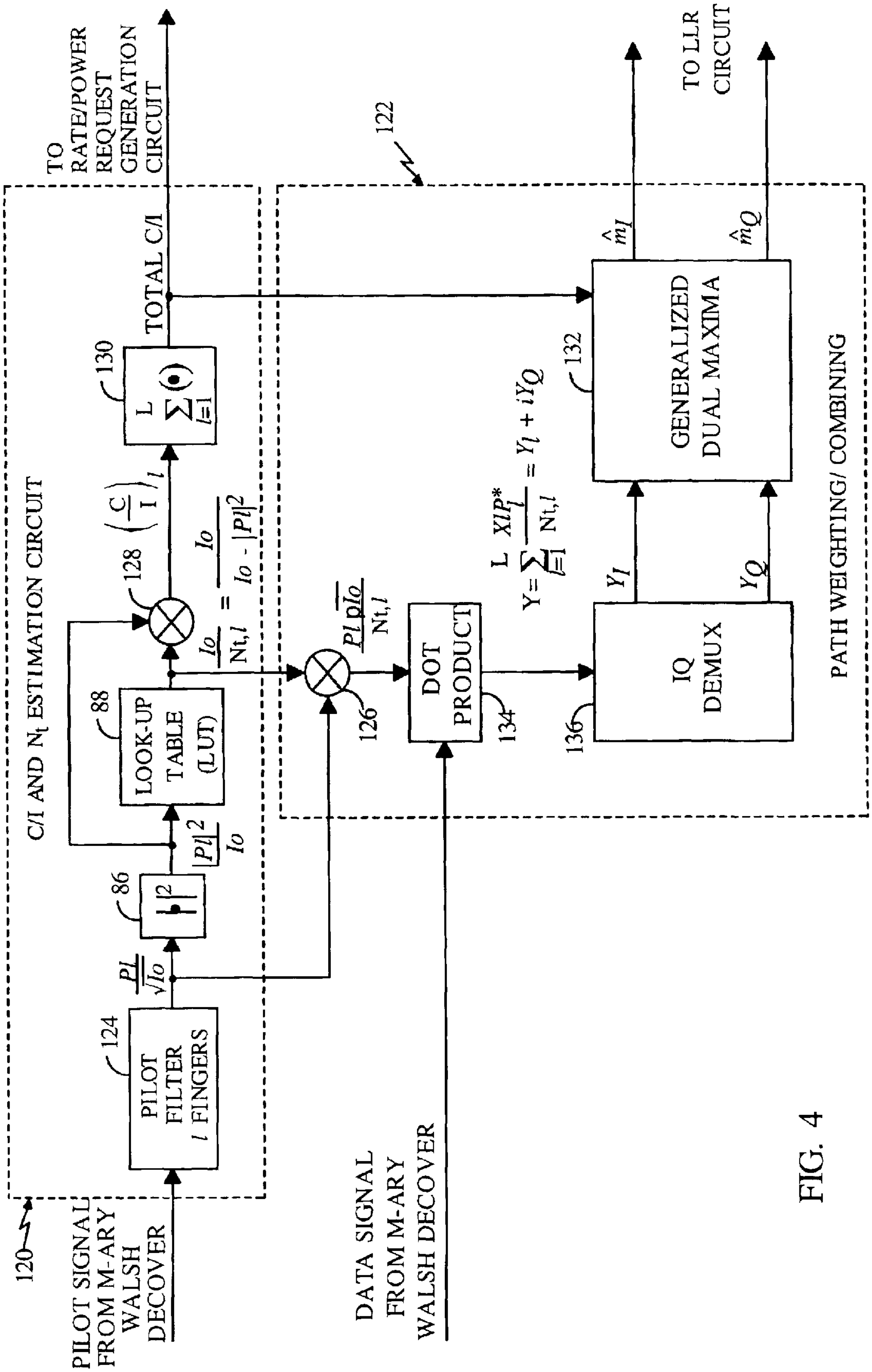
FIG. 4 is a diagram showing alternative embodiments of the accurate interference energy estimation circuit and the maximal ratio path-combining circuit of FIG. 2.

FIG. 4 is a diagram showing alternative embodiments 120 and 122 of the accurate interference energy estimation circuit and the maximal ratio path-combining circuit of FIG. 2, respectively, and is adapted for use with a forward link. The alternative C/I and Nt estimation circuit 120 includes a pilot fingers filter 124 connected, in parallel, to pilot energy calculation circuit 86 and to an input of a pilot signal multiplier 126. The output of the pilot energy calculation circuit 86 is connected, in parallel, to the LUT 88 and to an input of a pilot energy signal multiplier 128.

An output of the LUT 88 is connected, in parallel, to another input of the pilot energy signal multiplier 128 and to another input of the pilot signal multiplier 126. The output of the pilot energy signal multiplier 128 is input to a C/I path accumulation circuit 130. An output of the C/I path accumulation circuit 130 is connected, in parallel, to an input of the rate/power generation circuit 44 of FIG. 1 and to an input of an generalized dual maxima circuit 132.

An output of the pilot signal multiplier 126 is connected to an input of a dot product circuit 134. Another input of the dot product circuit 134 is connected to an output of the M-ary Walsh decover circuit 72 of FIG. 3. An output of the dot product circuit 134 is connected to an input of an I and Q signal demultiplexer (DEMUX) 136. The I and Q DEMUX 136 provides a quadrature output ($Y_Q$) and an in-phase output ($Y_I$) of the I and Q signal DEMUX 136 are connected to an input of the generalized dual maxima circuit 132. An in-phase metric ($m_I$) and a quadrature metric ($m_Q$) of the generalized dual maxima circuit 132 are connected to the LLR circuit (see 46 of FIGS. 1, 2, and 3). The I and Q DEMUX 136 provides a quadrature output ($Y_Q$) and an in-phase output ($Y_I$) of the I and Q signal DEMUX 136 are connected to an input of the generalized dual maxima circuit 132.

In operation, the pilot fingers filter 124 receives a despread pilot signal from the output of the M-ary Walsh decover circuit 72 of FIG. 3 and outputs a filtered signal (p) in accordance with the following equation:

$$p = \frac{P_l}{\sqrt{I_0}}, \qquad [10]$$

where $P_l$ is a pilot signal associated with the $l^{th}$ multipath component of the received pilot signal, and $I_o$ is the total received energy per chip as defined by the following equation:

$$I_0 = I_{or,l} + N_{t,l}, \qquad [11]$$

where $N_{t,l}$ represents, as previously mentioned, the interference and noise component associated with the $l^{th}$ multipath component of the received signal, and $I_{or}$, represents the energy of the desired component of the received signal associated with the $l^{th}$ multipath component.

The filtered signal p is input to the pilot energy calculation circuit 86 where the magnitude of the signal p is squared and output to the LUT 88. The LUT 88 is adjusted to subtract the squared signal p2 from I and then invert the result to yield the following equation:

$$\frac{1}{1 - \frac{|P_l|^2}{I_0}} = \frac{I_0}{I_0 - |P_l|^2} = \frac{I_0}{N_{t,l}}, \qquad [12]$$

where $P_l$ and $I_o$ are as given for equations (10) and (11). $N_{t,l}$, as mentioned previously, represents the energy associated with an interference and noise component of the received signal associated with the $l^{th}$ multipath component. $|P_l|^2$ provides an accurate estimate of $I_{or}$.

The resulting output of the LUT 88 is multiplied by the output of the pilot energy computation circuit 86 via the pilot energy signal multiplier 128 to yield an accurate C/I value for the $l^{th}$ multipath component of the signal received by the system 20 of FIG. 1. The C/I values are added over the L multipaths comprising the received signal via the C/I path accumulation circuit 130. The C/I path accumulation circuit 130 provides an accurate estimate of the total C/I to the rate/power request generation circuit 44 of FIG. 1 and to the generalized dual maxima computation circuit 132.

The pilot signal multiplier 126 multiplies the output of the pilot fingers filter 124 with the output of the LUT 88 to yield the following output (y):

$$y = \frac{P_l\sqrt{I_0}}{N_{t,l}}, \qquad [13]$$

where the variables are as given for equation (12).

The output of the pilot signal multiplier 126 as given in equation 13 is provided to the dot product circuit 134. The dot product circuit 134 also receives as input a data signal (d) from the M-ary Walsh decover circuit 72 of FIG. 2. In the present embodiment, the data signal d is represented by the following equation:

$$d = \frac{X_l}{\sqrt{I_0}}, \qquad [14]$$

where $X_l$ is a quadrature amplitude modulation (QAM) signal associated with the $l^{th}$ multipath component of the signal received by the system 20 of FIG. 1, and $I_o$ is as given in equation (11).

The system of FIG. 4 implements a similar algorithm as the system of FIG. 2 with the exception that the system of FIG. 4 shows scaling due to automatic gain control circuitry (see FIG. 1) explicitly. The system of FIG. 4 also shows the LUT 88 used to convert (Ior,l)/(Io) to (Ior,l)/(Nt,l) and to the reciprocal of (Nt,l.)/(Io) without explicitly computing Io as in FIG. 2. (Ior,l)/(Io) is approximately equal to (|Pl|2)/(Io) as output from the pilot energy calculation circuit 86 of FIG. 4 and equals Ep/Io if Ep/Ior=1, where Ep is the pilot symbol energy as described above.

The dot product circuit 134 takes the dot produce of the signal d with the signal y, which are defined in equations (14) and (13), respectively, and provides an output signal (Y) in accordance with the following equation:

$$Y = \sum_{l=1}^{L} \frac{X_l P_l^*}{N_{t,l}} = Y_I + iY_Q, \tag{15}$$

where L is the total number of multipaths; l is a counter and represents a particular l path of the L multipaths; $Y_I$ represents an in-phase component of the received data signal, and $Y_Q$ represents an imaginary quadrature component of the received data signal. The other variables, i.e., $X_l$, $P_l$, and $N_{t,l}$ are as given for equations (13) and (14).

The DEMUX 136 selectively switches I ($Y_I$) and Q ($Y_Q$) components of the output Y defined by equation (15) onto separate paths that are provided to the generalized dual maxima circuit 132 that outputs metrics $\hat{m}_I$ and $\hat{m}_Q$, respectively, in response thereto to the LLR circuit 46 of FIG. 1.

All circuit components and modules employed to construct the present invention such as those employed in the system of FIG. 4 are easily constructed by those having ordinary skill in the art.

Figure 5:
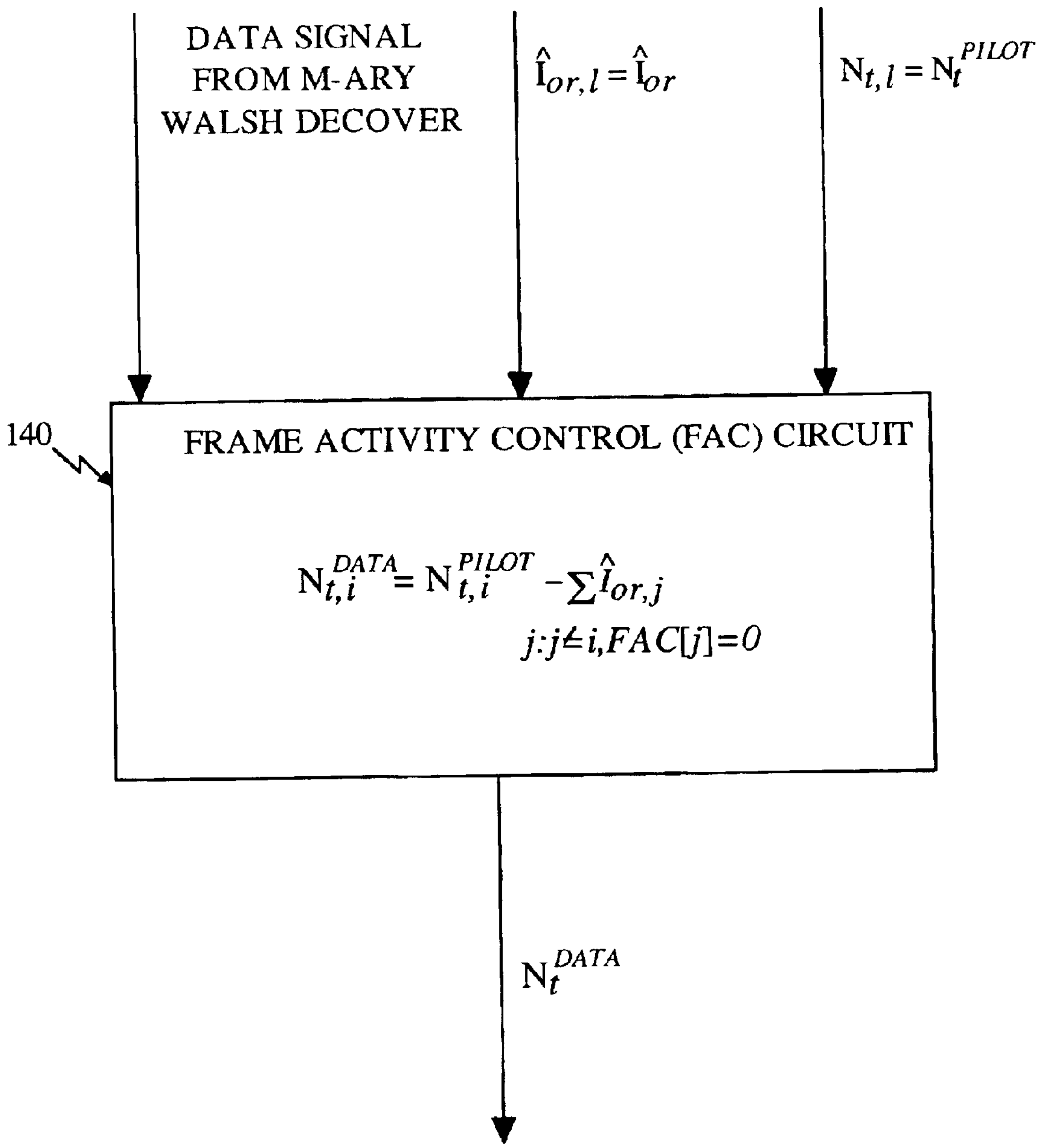
FIG. 5 is a block diagram of a frame activity control circuit for improving estimates of interference energy and which is adapted for use with the accurate interference energy computation circuit of FIG. 2.

FIG. 5 is a block diagram of a frame activity control (FAC) circuit 140 for improving estimates of interference energy ($N_t$) and is adapted for use with the accurate C/I and Nt estimation circuit 12 of FIG. 2.

With reference to FIGS. 2 and 5, the FAC circuit 140 can be inserted in the C/I and Nt estimation circuit 12 of FIG. 2 at the input of the LUT 88. The FAC circuit 140 receives Nt,l from the output of the subtractor circuit 80 and the data channel output from the M-ary Walsh Decover 72, and the output of the first multiplier 82 and outputs a new estimate of Nt,l, i.e., $N_l^{Data}$, which is an interference (including noise) estimate revised for the fact that some base stations broadcast during the pilot interval and do not broadcast during the data interval. Base stations that broadcast during the pilot interval contribute to the noise and interference associated with the channel and measured via the pilot signal. If some base stations do not broadcast during the data interval but broadcast during the pilot interval, the estimate of the channel noise and interference based on the pilot interval will be too large, i.e., Nt,data<Nt,pilot and (C/I) data<(C/I)pilot.

In accordance with the teachings of the present invention, waveforms broadcast by base stations include a frame activity bit (FAC bit). The FAC bit indicates to a mobile station, such as the system 10 of FIG. 1 whether or not the traffic channel of the associated pilot signal will be transmitting during the half frame following the next half frame. If the FAC bit is set to a logical 1, for example, the forward traffic channel may be inactive. If the FAC bit is clear, i.e., corresponds to a logical 0, the corresponding forward channel is inactive. The FAC bit transmitted during half-frame n for the $i^{th}$ base station, i.e., $FAC_i(n)$ specifies the forward data channel activity for the next frame, i.e., half frame (n+2).

Use of the FAC bit improves C/I estimates in communications systems where some base stations broadcast during the pilot interval and not during the data interval. As a result, use of the FAC bit results in superior data rate control as implemented via the rate/power request generation circuit 44 of FIG. 1. Use of the FAC bit also helps to ensure that forward data channel transmissions of up to 8 slots, beginning with half-frame n+1 and based on data rate control messages accounting for base station inactivity via the FAC bits, are valid.

The FAC circuit 140 subtracts the interference contributions from the base stations that will not be broadcasting during the data interval in accordance with the following equation.

$$N_{t,i}^{Data} = N_{t,i}^{Pilot} - \sum_{j:j\neq i, FAC[j]=0} \hat{I}_{or,j}, \tag{16}$$

where i is the index of the base station, i.e., the sector for which $N_{t,i}^{Data}$ is being estimated. j is a counter that is incremented for each base station counted. $N_{t,l}^{Data}$ represents the interference energy for the $l^{th}$ multipath component and is associated with the data transmission for the $j^{th}$ base station. Similarly, $N_{t,i}^{Pilo}$ represents the interference energy for the $l^{th}$ multipath component and is associated with the pilot transmission for the $j^{th}$ base station. $\hat{I}_{or,j}$ is the energy of the desired signal component received from the $j^{th}$ base station.

With access to the present teachings, those ordinarily skilled in the art can easily construct the FAC circuit 140 without undue experimentation.

During the pilot interval and while the interference energy Nt is being estimated, all base stations in communication with the transceiver system 10 of FIG. 1 are transmitting at full power. If a certain base station is idle during the data intervals preceding and following a pilot interval, then in the presence of a large multipath spread, the interference from the base station may not be received during the entire duration of the pilot signal from another base station. To avoid a resulting inaccuracy in the estimation of Nt, the base station transmits an idle skirt signal before and after pilot bursts and during idle data intervals. The length of the idle skirt signal is longer than the anticipated multipath spread associated with the channel. In a preferred embodiment, the length of the idle skirt signal is configurable from a minimum length of zero to a maximum length of 128 chips.

Figure 6:
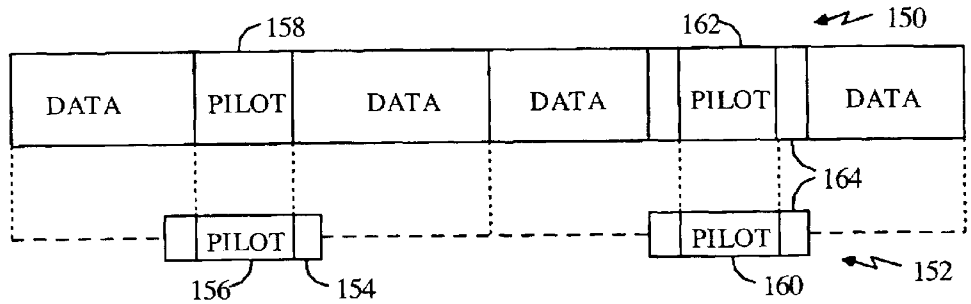
FIG. 6 is an exemplary timing diagram showing an active slot and idle slot.

FIG. 6 is an exemplary timing diagram showing an active slot 150 and an idle slot 152. Pilot skirts 154 are shown before and after a first pilot burst 156 and during idle slot 152. The first pilot burst 156 corresponds to a second pilot burst 158 during the active slot 150.

FAC signals 164, i.e., reverse power control channel (RPC) signals are also shown before and after a third pilot burst 160 in the idle slot 152 and a corresponding fourth pilot burst 162 in the active slot 150.

Figure 7:
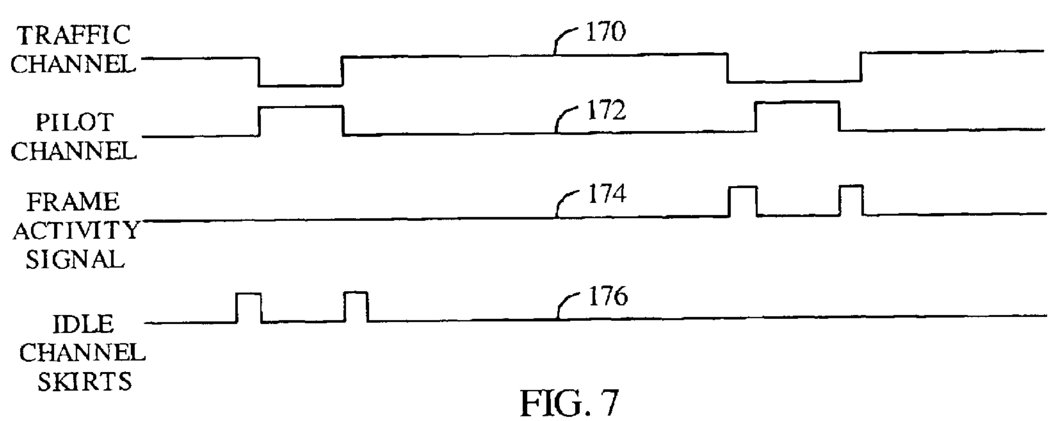
FIG. 7 is an exemplary timing diagram showing a traffic channel signal, a pilot channel signal, a frame activity signal (FAC) (also known as a reverse power control channel), and idle channel skirts of the slots of FIG. 6.

FIG. 7 is an exemplary timing diagram showing a traffic channel signal 170, a pilot channel signal 172, a frame activity signal 174 (FAC), and an idle channel skirt signal 176 of the slots of FIG. 6.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A code division multiple access (CDMA) communication apparatus, comprising:

means for receiving a signal over a wireless channel, the received signal comprising a desired signal component and an interference component;

means for estimating carrier signal-to-interference and interference energy of the received signal to generate an interference energy value and a signal-to-interference ratio of the received signal, the means for estimating carrier signal-to-interference and interference energy comprising means for extracting an estimate of the desired signal component from the received signal; and means for generating summed weighted-path signals in response to the interference energy value and the estimate of the desired signal component.

2. The apparatus of claim 1, further comprising means for generating soft decision values based on the summed weighted-path signals.

3. The apparatus of claim 2, wherein the means for generating soft decision values comprises a log-likelihood ratio generator.

4. The apparatus of claim 2, further comprising means for generating decoded signals based on the soft decision values.

5. The apparatus of claim 4, further comprising means for generating a message selected from the group consisting of a rate control message and a power fraction request message based on the signal-to-interference ratio.

6. The apparatus of claim 1, wherein the means for receiving a signal comprises an intermediate-frequency (IF)-to-baseband converter to generate spread-spectrum in-phase and quadrature signals based on the received signal.

7. The apparatus of claim 6, wherein the means for extracting an estimate of the desired signal component comprises a pseudo-noise despreader to generate despread in-phase and quadrature signals based on the spread-spectrum in-phase and quadrature signals.

8. The apparatus of claim 7, wherein the means for extracting an estimate of the desired signal component further comprises a decoverer connected to the pseudo-noise despreader to separate data signals along a data channel and a pilot signal along a pilot channel from the despread in-phase and quadrature signals.

9. The apparatus of claim 8, wherein the data channel is described by the following equation:

$$s=\sqrt{M\hat{E}_{s,l}}\cdot e^{j\hat{\theta}_l}X_t,$$

where s represents the data channel, M is the number of chips per Walsh symbol, $\hat{E}_{s,l}$ is modulation symbol energy of an $l^{th}$ multipath component of the data channel, $\hat{\theta}_l$ is the phase of the data channel s, and $X_t$ is an information-bearing component of the data channel.

10. The apparatus of claim 8, wherein the means for estimating carrier signal-to-interference and interference energy further comprises a pilot filter connected to the decoverer to generate a filtered pilot signal.

11. The apparatus of claim 10, wherein the filtered pilot signal is described by the following equation:

$$p=M\sqrt{\hat{E}_{p,t}}\cdot e^{j\theta_l}$$

where p represents the filtered output signal, M is the number of chips per Walsh symbol, $\hat{E}_{p,t}$ is pilot chip energy of an lth multipath component of p, and θl is the phase of p.

12. The apparatus of claim 11, wherein the means for estimating carrier signal-to-interference and interference energy further comprises a forward link constant generator capable of generating a forward link constant.

13. The apparatus of claim 12, wherein the forward link constant is described by the following equation:

$$c=\frac{1}{M^2}\frac{I_{or}}{E_p}$$

where c represents the forward link constant, $I_{or}$ is received energy of the desired signal component; and $E_p$ is pilot chip energy.

14. The apparatus of claim 13, wherein the means for estimating carrier signal-to-interference and interference energy further comprises a look-up table capable of generating a reciprocal of the interference energy value based on the despread in-phase and quadrature signals, the filtered pilot signal and the forward link constant.

15. The apparatus of claim 14, wherein the means for generating summed weighted-path signals comprises:

a constant generator capable of generating a constant $$k=\frac{1}{M}\sqrt{\frac{E_s}{E_p}},$$

where $E_s$ is modulation symbol energy; and a multiplier connected to the constant generator and the pilot filter to generate an estimate of a channel coefficient $$\hat{\alpha}=\sqrt{\hat{E}_{s,t}}\cdot e^{j\hat{\theta}_l},$$

where $\hat{E}_{s,l}$ is an estimate of the modulation symbol energy of the $l^{th}$ multipath component, and $\hat{\theta}_l$ is an estimate of the phase of the pilot signal.

16. The apparatus of claim 15, wherein the summed path-weighted signals are generated based on the estimate of the channel coefficient, the reciprocal of the interference energy value, and the number of chips per Walsh symbol.

* * * * *